(12) United States Patent
Ruiz et al.

(10) Patent No.: US 11,683,314 B2
(45) Date of Patent: *Jun. 20, 2023

(54) METHOD AND APPARATUS FOR CONTROLLING ACCESS TO CUSTOM BROWSER FUNCTIONALITY

(71) Applicant: DIRECTV, LLC, El Segundo, CA (US)

(72) Inventors: Rudy Ruiz, Irvine, CA (US); Mark T. Thorson, Los Angeles, CA (US)

(73) Assignee: DIRECTV, LLC, El Segundo, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 17/347,424

(22) Filed: Jun. 14, 2021

(65) Prior Publication Data

US 2021/0306339 A1 Sep. 30, 2021

Related U.S. Application Data

(63) Continuation of application No. 16/664,874, filed on Oct. 27, 2019, now Pat. No. 11,038,890, which is a
(Continued)

(51) Int. Cl.
*H04L 29/06* (2006.01)
*H04L 9/40* (2022.01)
(Continued)

(52) U.S. Cl.
CPC ............ *H04L 63/101* (2013.01); *G06F 21/52* (2013.01); *G06F 21/629* (2013.01); *H04L 67/02* (2013.01);
(Continued)

(58) Field of Classification Search
CPC ..... H04L 63/101; H04L 63/168; H04L 67/34; G06F 21/52; G06F 21/629; G06F 2221/2119; G06F 2221/2141
See application file for complete search history.

(56) References Cited

U.S. PATENT DOCUMENTS 7,490,125 B1 2/2009 Jagadeesan et al.
7,627,569 B2 12/2009 Gafter
(Continued)

OTHER PUBLICATIONS

James Mickens et al., Atlantis: Robust, Extensible Execution Environments for Web Applications, Oct. 23-26, 2011, ACM, pp. 217-231. (Year: 2011).*
(Continued)

*Primary Examiner* — Kari L Schmidt
*Assistant Examiner* — Fahimeh Mohammadi
(74) *Attorney, Agent, or Firm* — Hanley, Flight & Zimmerman, LLC

(57) ABSTRACT

A method, non-transitory computer readable medium and apparatus for controlling access of a custom browser function are disclosed. For example, the method includes a processor that sends a request to a third party website, receives a hypertext markup language code and a browser script, renders the hypertext markup language code, detects that the browser script is trying to access a custom browser function, compares one or more parameters associated with the custom browser function to an access control list to control an access of the custom browser function, and executes the custom browser function when a match of the one or more parameters is found in the access control list.

20 Claims, 4 Drawing Sheets

Related U.S. Application Data continuation of application No. 15/211,900, filed on Jul. 15, 2016, now Pat. No. 10,462,145.

(51) Int. Cl.
| | | |
|---|---|---|
| *H04L 67/00* | (2022.01) | |
| *H04L 67/02* | (2022.01) | |
| *G06F 21/62* | (2013.01) | |
| *G06F 21/52* | (2013.01) | |

(52) U.S. Cl.
CPC ...... *H04L 67/34* (2013.01); *G06F 2221/2119* (2013.01); *G06F 2221/2141* (2013.01); *H04L 63/168* (2013.01)

(56) References Cited

U.S. PATENT DOCUMENTS

| | | | |
|---|---|---|---|
| 7,958,234 B2 | 6/2011 | Thomas et al. | |
| 8,001,456 B2 | 8/2011 | McElroy et al. | |
| 8,806,431 B1 | 8/2014 | Colton et al. | |
| 8,843,820 B1* | 9/2014 | Kay | G06F 21/51 |
| | | | 715/234 |
| 9,148,677 B2 | 9/2015 | Bulkowski et al. | |
| 9,251,362 B2 | 2/2016 | Nimura et al. | |
| 9,258,136 B2 | 2/2016 | Verschoor et al. | |
| 10,462,145 B2 | 10/2019 | Ruiz et al. | |
| 11,038,890 B2 | 6/2021 | Ruiz et al. | |
| 2004/0165007 A1* | 8/2004 | Shafron | G06F 16/957 |
| | | | 707/E17.119 |
| 2006/0248537 A1 | 11/2006 | Marks | |
| 2007/0061486 A1* | 3/2007 | Trinh | G06F 16/9577 |
| | | | 709/246 |
| 2007/0107057 A1* | 5/2007 | Chander | G06F 21/54 |
| | | | 726/22 |
| 2009/0125579 A1* | 5/2009 | Saillet | H04L 69/329 |
| | | | 709/203 |
| 2009/0193497 A1 | 7/2009 | Kikuchi et al. | |
| 2009/0271690 A1* | 10/2009 | Iglesias | G06F 9/451 |
| | | | 715/200 |
| 2009/0328137 A1 | 12/2009 | Liang et al. | |
| 2011/0055892 A1* | 3/2011 | Wang | H04L 63/1441 |
| | | | 710/36 |
| 2011/0083119 A1 | 4/2011 | Emmelmann | |
| 2011/0138174 A1* | 6/2011 | Aciicmez | G06F 21/6272 |
| | | | 713/165 |
| 2011/0289582 A1 | 11/2011 | Kejriwal et al. | |
| 2012/0151373 A1 | 6/2012 | Kominac et al. | |
| 2012/0158984 A1* | 6/2012 | Maitre | H04N 21/43615 |
| | | | 709/231 |
| 2013/0013734 A1* | 1/2013 | Garfinkle | H04L 67/02 |
| | | | 709/217 |
| 2013/0239231 A1 | 9/2013 | Korycki et al. | |
| 2013/0254836 A1* | 9/2013 | Aciicmez | G06F 21/6272 |
| | | | 726/4 |
| 2014/0289855 A1* | 9/2014 | Shulman | H04L 67/02 |
| | | | 726/23 |
| 2015/0073955 A1* | 3/2015 | Gilman | G06Q 30/04 |
| | | | 705/34 |

OTHER PUBLICATIONS

Charles Reis et al., BrowserShield: Vulnerability-Driven Filtering of Dynamic HTML, Sep. 2007, ACM, vol. 1 Issue 3, pp. 1-32. (Year: 2007).*

Mike Ter Louw et al., BLUEPRINT: Robust Prevention of Cross-site Scripting Attacks for Existing Browsers, May 17-20, 2009, IEEE, pp. 331-346. (Year: 2009).*

Rodolfo Toledo et al., Access Control in JavaScript, Sep.-Oct. 2011, IEEE, vol. 28 , Issue: 5, pp. 76-84. (Year: 2011).*

James Mickens et al., Atlantis: Robust, Extensible Execution Environments for Web Applications, Oct. 23-26, 2011, ACM, pp. 217-231.

Charles Reis et al., Browsershield: Vulnerability-Driven Filtering of Dynamic HTML, Sep. 2007, ACM, vol. 1 Issue 3, pp. 1-32.

MikeTer Louwetal, BLUEPRINT: Robust Prevention of Cross-site Scripting Attacks for Existing Browsers, May 17-20, 2009, IEEE, pp. 331-346.

Rodolfo Toledo et al., Access Control in JavaScript, Sep.-Oct. 2011, IEEE, vol. 28 , Issue: 5, pp. 76-84.

Grier, Chris, Shuo Tang, and Samuel T. King. "Secure web browsing with the Op web browser." Security and Privacy, 2008.

United States Patent and Trademark Office, "Non-final Office Action," issued in connection with U.S. Appl. No. 15/211,900, dated Mar. 23, 2018, 20 pages.

United States Patent and Trademark Office, "Final Office Action," issued in connection with U.S. Appl. No. 15/211,900, dated Sep. 17, 2018, 27 pages.

United States Patent and Trademark Office, "Non-final Office Action," issued in connection with U.S. Appl. No. 15/211,900, dated Feb. 12, 2019, 19 pages.

United States Patent and Trademark Office, "Notice of Allowance and Fee(s) Due," issued in connection with U.S. Appl. No. 15/211,900, dated Jun. 18, 2019, 14 pages.

United States Patent and Trademark Office, "Non-final Office Action," issued in connection with U.S. Appl. No. 16/664,874, dated Oct. 28, 2020, 8 pages.

United States Patent and Trademark Office, "Notice of Allowance and Fee(s) Due," issued in connection with U.S. Appl. No. 16/664,874, dated Feb. 11, 2021, 10 pages.

Mike Ter Louw et al., BLUEPRINT: Robust Prevention of Cross-site Scripting Attacks for Existing Browsers, Aug. 18, 2009, IEEE, pp. 331-346.

* cited by examiner

| DOMAIN | PATH | OBJECT | READ | WRITE | EXECUTABLE |
|---|---|---|---|---|---|
| WWW.EXAMPLE.COM | * | CUSTOM.WRITE() | 0 | 0 | 1 |
| *.ABC.COM | /HOME/ | EXAMPLE.ITEM | 1 | 0 | 0 |

FIG. 2

METHOD AND APPARATUS FOR CONTROLLING ACCESS TO CUSTOM BROWSER FUNCTIONALITY

This application is a continuation of U.S. patent application Ser. No. 16/664,874, filed Oct. 27, 2019, now U.S. Pat. No. 11,038,890, which is a continuation of U.S. patent application Ser. No. 15/211,900, filed Jul. 15, 2016, now U.S. Pat. No. 10,462,145, both of which are herein incorporated by reference in their entirety.

The present disclosure relates to browser scripts executed by built-in browsers of a system and more particularly, to a method and apparatus of controlling access to custom browser functionality.

BACKGROUND

Browsers can execute scripts that allow webpages rendered by a browser to execute some client side code. Typically, a browser on a system sends a request to a domain and the domain returns some hypertext markup language (HTML) code and browser scripts. The browser may then render the HTML code and execute the browser scripts.

Some systems such as set top boxes, appliances, video game consoles, televisions, and the like, may have built-in browsers that have been extended upon to expose additional functions, objects, and/or variables that may only be available to the underlying system. While exposing the functions, objects, and/or information would increase functionality of the device, it could pose a serious security risk when rendering pages from a domain that is not fully trusted.

SUMMARY

In one example, the present disclosure discloses a method, non-transitory computer readable medium and apparatus for controlling access to a custom browser function. For example, the method includes a processor that sends a request to a third party website, receives a hypertext markup language code and a browser script, renders the hypertext markup language code, detects that the browser script is trying to access a custom browser function, compares one or more parameters associated with the custom browser function to an access control list to control an access of the custom browser function, and executes the custom browser function when a match of the one or more parameters is found in the access control list.

BRIEF DESCRIPTION OF THE DRAWINGS

The teaching of the present disclosure can be readily understood by considering the following detailed description in conjunction with the accompanying drawings, in which:

FIG. 2 illustrates an example of an access control list;

To facilitate understanding, identical reference numerals have been used, where possible, to designate identical elements that are common to the figures.

DETAILED DESCRIPTION

The present disclosure broadly discloses examples of a method and apparatus for controlling access of a custom browser script. As discussed above, browsers can execute scripts that allow webpages rendered by a browser to execute some client side code. For example, a browser on a system sends a request to a domain and the domain returns some hypertext markup language (HTML) code and browser scripts. The browser may then render the HTML code and execute the browser scripts.

Some systems such as set top boxes, appliances, video game consoles, televisions, and the like, may have built-in browsers that have been extended upon to expose additional functions, objects, and/or variables that may only be available to underlying particular model or class of systems. While exposing the functions, objects, and/or variables would improve the functionality of the device, it could pose a serious security risk when rendering pages from a domain that is not fully trusted.

One embodiment of the present disclosure provides a way to control access of the custom functionality contained in a browser that has been modified. For example, an access control list may be pre-defined by a service provider and transmitted to the system having the built-in browser. The access control list may define which third party service providers/web sites may have access to the custom features, extensions, objects, variables, and the like of the underlying system via a browser scripting engine. The access control list may contain a signature to provide integrity guarantees.

Figure 1:
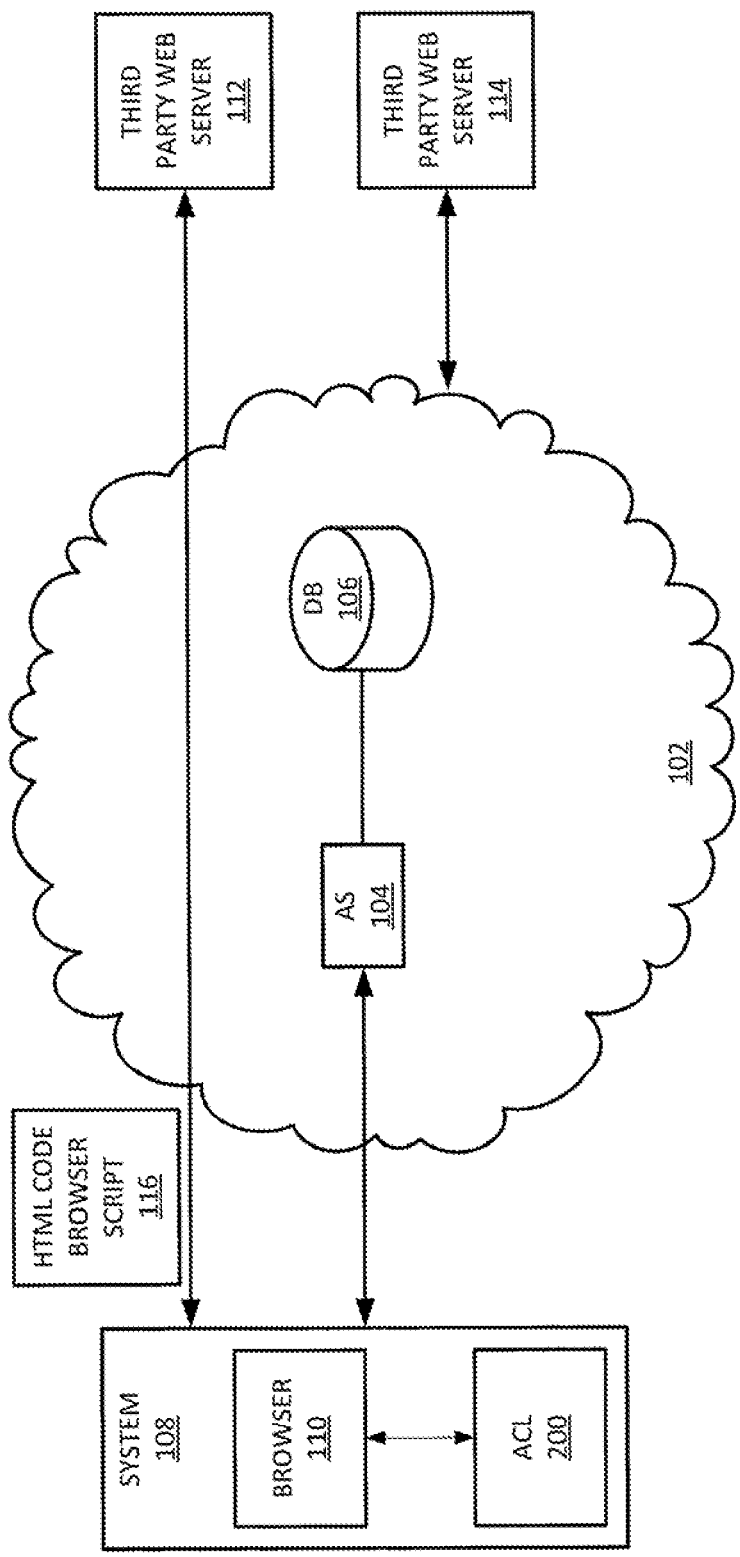
FIG. 1 illustrates an example communications network related to the present disclosure.

To aid in understanding the present disclosure, FIG. 1 illustrates an example communication network 100. In one embodiment, the communication network 100 may include an Internet Protocol (IP) network 102 that includes an application server (AS) 104 and a database (DB) 106. It should be noted that the IP network 102 has been simplified for ease of explanation. For example, the IP network 102 may include one or more network elements that are not shown, such as, additional access networks, border elements, firewalls, cable modems, application servers, databases, and the like. In one embodiment, the IP network 102 may be operated and managed by a service provider that provides services to subscribers (e.g., communication services, cable services, internet services, and the like).

In one embodiment, the DB 106 may store various information such as a list of subscribers, personal information associated with each subscriber, a list of services associated with each subscriber, and the like. In one embodiment, the AS 104 may be in communication with a system 108 of a subscriber. In one embodiment, the system 108 may be any type of endpoint device having a built-in browser 110. The built-in browser 110 may be a graphical user interface that allows the system 108 to interact with web pages hosted by a third party web server 112 and/or 114. The system 108 may include a processor and a non-transitory computer readable storage medium for storing instructions that are executed by the processor.

In one embodiment, the system 108 may be a set top box, an appliance (e.g., a refrigerator and the like), a video game system, and the like. Although the system 108 is not a typical computer, it may still have some of the functionalities of a typical computer. As a result, the built-in browser 110 may contain custom functions, objects, or variables that allow access to information associated with the underlying system 108. It should be noted that custom functions used herein may refer to custom functions, objects and/or variables. There may be security risks associated with exposing a functionality that discloses information, or allows changes or access to the underlying system or custom browser functionality since browser executable code (e.g., a browser script) could originate from any domain (e.g., domains hosted by potential hackers).

In one embodiment, the custom functionality contained in the browser may be a Javascript object or Javascript code. For example, the Javascript object may be a Javascript method that can be executed by the built-in browser 110, a Javascript item that can be read by the built-in browser 110, and the like.

In one embodiment, the "custom" browser functionality may be any browser function, object, and/or variable that does not meet the criteria of, or is outside of the standard of, the European Computer Manufacturers Association (ECMA). In another embodiment, the "custom" browser functionality may be defined as a browser functionality that is not created by a manufacturer of the built-in browser 110. For example, the manufacturer of the built-in browser 110 may deploy the built-in browser 110 with a standard set of browser functions. However, the service provider of the communication network 102 may create and add custom functions within the browser to obtain additional information to customize the types of data that are collected and analyzed.

In one embodiment, the "custom" browser functionality may be defined as a browser function that includes a function call, or a subroutine, to check an access control list 200. For example, all custom functions contained in browser may perform a function call to check one or more parameters associated with the custom functions contained in a browser to a corresponding one or more parameters in the access control list 200.

In one embodiment, the function call to check the access control list 200 may be the first function executed. In other words, the command to check the access control list 200 may be executed before any other function calls to ensure that the domain or website has permission to access a function, object or information of the system 108. Additional descriptive, or non-executable, lines may be added before the first executable function call.

In one embodiment, the one or more custom functions contained in a browser may further be defined as functions, methods, objects, variables, or code that are modified, or created, to access information obtained by the underlying system 108 that otherwise could not be accessed using a functionality that came with the built-in browser 110. For example, the custom functions contained in the browser may collect information about what television shows are being watched, what television stations are being watched, what food items are being ordered, what video games are being played, how many hours are being spent watching a particular show or stations, operating parameters of an appliance, and the like.

As noted above, the AS 104 may be in communication with the system 108. The access control list 200 may be pre-defined by the service provider of the IP network 102 and transmitted from the AS 104 to the system 108. It should be noted that although a single system 108 is illustrated in FIG. 1, a plurality of systems 108 may be deployed. As a result, the AS 104 may transmit the access control list 200 to each one of the plurality of systems 108.

In one embodiment, the access control list 200 may be personalized for different subscribers or different types of systems 108. For example, some subscribers may opt out of having certain data collected form their system 108. As a result, the service provider may deploy a different access control list 200 to those subscribers who have opted out. In another example, a first access control list 200 may be transmitted to systems 108 that are set top boxes, a different second access control list 200 may be transmitted to systems 108 that are appliances, and so forth. Over time, the service provider may change and update the access control list 200 as needed.

FIG. 2 illustrates an example of the access control list 200. The access control list 200 may include a table having a plurality of columns 202, 204, 206, 208, 210 and 212 and a plurality of rows $214_1$ to $214_n$ (herein after referred to individually as a row 214 or collectively as rows 214). It should be noted that although six columns are illustrated in FIG. 2, that the access control list 200 may include more or less columns. It should also be noted that the order of the columns 202, 204, 206, 208, 210 and 212 may be changed without departing from the scope of the present disclosure.

In one embodiment, the column 202 may define a domain. For example, the domain may be an identification string that defines a realm of administrative autonomy, authority or control within the Internet, or an Internet protocol (IP) address. For example, the domain may be a name associated with a name registered in a domain name system.

In one embodiment, the column 204 may define a path. For example, each domain may include a plurality of different webpages associated with the domain. The path may define a unique location within the domain using a series of backslashes (e.g., www.example.com/home/user_information). In one embodiment, wildcards (e.g., the symbol "*") may be used for the domain in column 202 or the path in column 204 as shown in FIG. 2.

In one embodiment, the column 206 may define an object. For example, the column 206 may include the name or identification associated with a custom function, object, variable, information, and the like, of the system 108. As noted above, the custom function contained in the browser script may be a custom Javascript object (e.g., a method, an item, and the like). The columns 208, 210 and 212 may indicate whether the custom browser function, object, variable, information, and the like, can be read, written or executed. A "0" may represent false and a "1" may represent true. For example, executable custom Javascript method may have a "1" under column 212 and "0's" under columns 208 and 210.

In one embodiment, the rows may represent entries of those domains and custom functions that may be allowed to access the system 108. For example, the domains may be the third party web servers 112 or 114 illustrated in FIG. 1. The third party web servers 112 and 114 may request permission from the service provider of the IP network 102 to execute a custom function contained in the built-in browser 110 to access certain information from the system 108. If permission is granted, the domain, path (if applicable), object and an indication of if the object is read, written or executed may be added to the access control list 200.

In one embodiment, once the access control list 200 is created, the access control list 200 may be transmitted to the system 108, as described above. The system 108 may send a request to the third party web server 112 to access a webpage. The third party web server 112 may be www.example.com that has been granted permission to execute a custom function "custom.write( )" that is listed in row $214_1$ of the access control list 200. In response to the request from the system 108, the third party web server 112 may send HTML code and the browser script 116 to the system 108. The browser script 116 may contain browser executable code that executes the custom functionality of the built-in browser 110 that has been modified.

The built-in browser 110 may render the HTML code to begin displaying the text, graphics, images, and the like associated with the web page. The built-in browser 110 may also begin executing the browser script 116 that executes the custom functionality of the built-in browser 110. In one embodiment, the built-in browser 110 may call an internal function to check the access control list 200 each time any custom functionality is executed.

As result, the built-in browser 110 may perform an integrity check and/or compare one or more parameters of the browser script 116 that executes the custom functionality (e.g., a domain associated with the custom function, a path, a name of the custom function and a type of custom function (e.g., read, write, or executable)) against a corresponding one or more parameters in the access control list 200. If a match is found and the permissions are valid, the built-in browser 110 may continue to execute the browser script 116 that contains the custom functionality. If no match is found, the built-in browser 110 may terminate the execution of the browser script 116 that contains the custom functionality and display an error message on a display of the system 108 or the web page may not fully render (e.g., certain images may be missing, certain links may be broken, and the like).

As a result, the present disclosure provides a way to control which entities have access to custom browser functionality on a system. The present disclosure provides an efficient and secure solution that maintains the security of the system 108, while allowing a custom browser functionality to be deployed and executed. As a result, the functionality of the built-in browsers may be expanded and not limited by the limitations of a standard browser.

Figure 3:
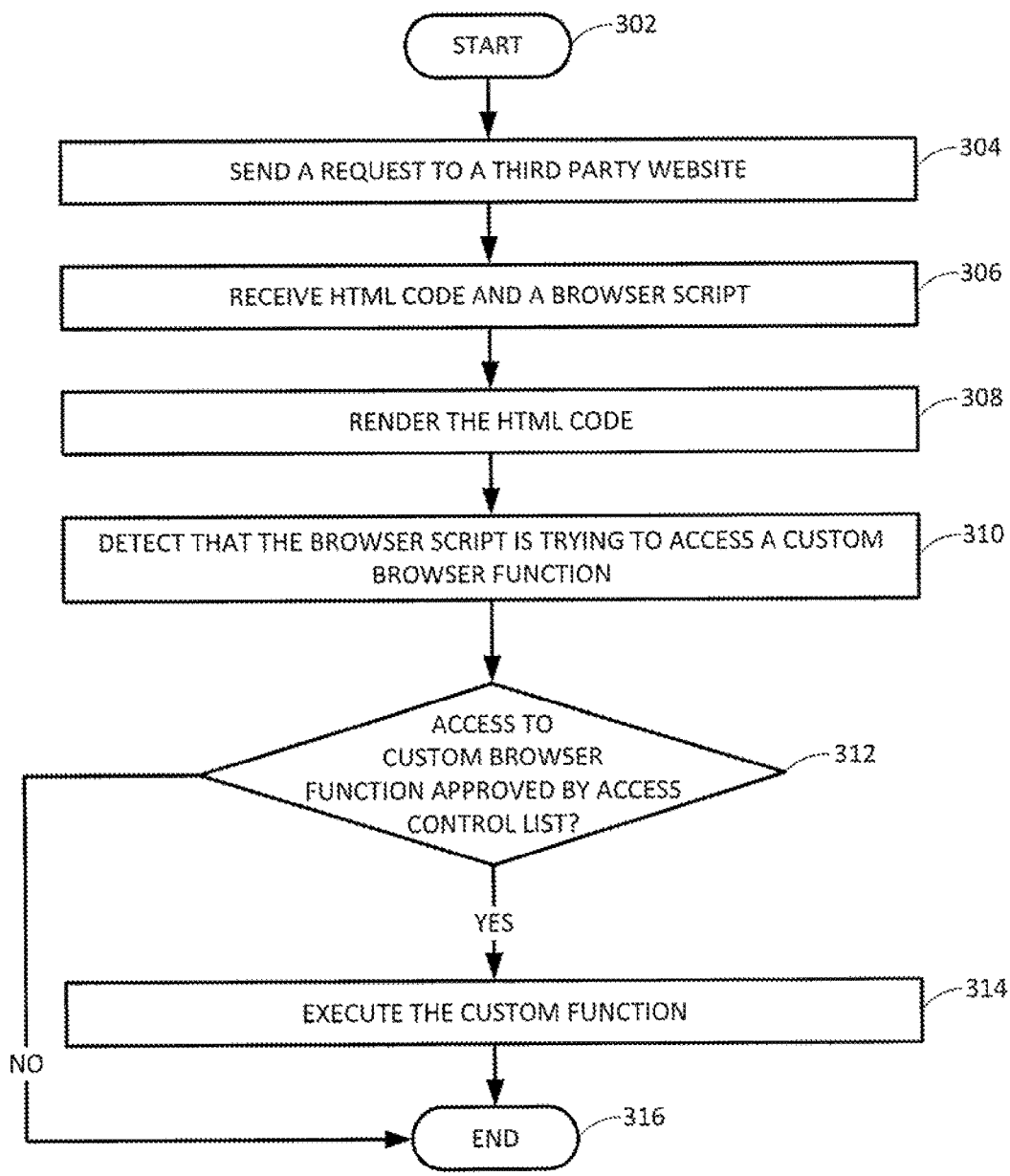
FIG. 3 illustrates a flowchart of an example method for controlling access to custom browser functionality.

FIG. 3 illustrates a flowchart of an example method 300 for controlling access to a custom browser functionality in accordance with the present disclosure. In one embodiment, steps, functions, and/or operations of the method 300 may be performed by the system 108. In one embodiment, the steps, functions, or operations of method 300 may be performed by a computing device or system 400, and/or processor 402 as described in connection with FIG. 4 below. For illustrative purpose, the example method 300 is described in greater detail below in connection with an embodiment performed by a processor, such as processor 402.

The method 300 begins in step 302. At step 304, a processor sends a request to a third party website. For example, the request may be to access a webpage hosted by a third party web server.

At step 306, the processor receives HTML code and a browser script. For example, in response to the request from a system having an embedded browser, the third party web server may transmit the HTML code and the browser script associated with the website that the embedded browser is trying to access.

In one embodiment, the browser script may be a Javascript object. For example, the Javascript object may be a Javascript method that can be executed by the browser or a Javascript item that is a variable that can be read by the browser.

At step 308, the processor renders the HTML code. For example, the HTML code may be rendered to begin displaying the graphics, text, images, and the like that are associated with the website.

At step 310, the processor detects that the browser script is trying to access a custom function. In one embodiment, the custom browser functionality may be a Javascript object. For example, the Javascript object may be a Javascript method that can be executed by the browser or a Javascript item that is a variable that can be read by the browser.

In one embodiment, the custom function may also be a custom object, custom variable, accessing custom information, and the like. For example, some browser scripts may be modified to contain custom functions, objects, variables, and the like, to access information that is on the system. For example, some custom functions may access or collect private information, such as, programs that are being watched, a number of hours of programming that are being watched, which channels are being watched, what items the subscriber is purchasing, personal information associated with a subscriber, and the like. As the system includes a built in browser that may be customized to operate with the operating system of the system, the built in browser may use customized functions. However, as noted above, custom browser functionality may be available to anyone and without security controls, scrupulous individuals may use the custom functionality in browser scripts to hack personal information from the system.

In one embodiment, a custom browser function may be defined as a browser function that falls outside of an ECMA standard. In another embodiment, the custom browser function may be any browser function that is different than a browser function that was deployed with the built-in browser by the browser manufacturer.

In another embodiment, the custom browser function may be a custom function that includes a function call to check an access control list before accessing the custom function. For example, standard browser functions may not include a function call or line of code to check an access control list because they are not monitored for security. However, due to the potential risks associated with extending access to the underlying system via custom browser functionality, the custom functions or objects may include a function call that performs a check of the access control list.

At step 312, the processor determines whether access to the custom function is approved by the access control list. For example, one or more parameters associated with the custom function may be compared to a corresponding one or more parameters in the access control list. In one embodiment, the access control list may determine which domains are allowed to use a custom function (e.g., a "white list). In another embodiment, the access control list may determine which domains are not allowed to use a custom browser function (e.g., a "black list").

In one embodiment, the one or more parameters may include a domain, a path and an object. The domain may include the address of the website. The path may include a specific location within the domain that can be accessed. For example, the access control list may only allow a particular page within the domain to execute custom functions as opposed to all pages within the domain. The object may include a name of the custom function. For example, only certain identified custom functions or objects for particular domains and/or paths may be executed, read or written.

In one embodiment, the domains, the path and the object may be predefined by a service provider associated with the system of the processor. For example, if the system is a set top box, the cable service provider may predefine the access control list and transmit the access control list to all of the subscribers' set top boxes. In another example, if the system is a video game system, the online game provider may predefine the access control list and transmit the access control list to all of the subscribers' video game systems, and so forth.

At step 312, if the processor determines that access to the custom function is not approved by the access control list, the method 300 may proceed to step 316. For example, a custom function may be terminated and an error message may be displayed to the user or the web page may not fully render (e.g., certain images may be missing, certain links may be broken, and the like).

However, if the processor determines that access to the custom function is approved by the access control list, the method 300 may proceed to step 314. At step 314, the processor may execute the custom function. At step 316, the method 300 ends.

It should be noted that although not specifically specified, one or more steps, functions or operations of the method 300 may include a storing, displaying and/or outputting step as required for a particular application. In other words, any data, records, fields, and/or intermediate results discussed in the respective methods can be stored, displayed and/or outputted to another device as required for a particular application. Furthermore, steps, blocks or operations in FIG. 3 that recite a determining operation or involve a decision do not necessarily require that both branches of the determining operation be practiced. In other words, one of the branches of the determining operation can be deemed as an optional step. In addition, one or more steps, blocks, functions or operations of the above described method 300 may comprise optional steps, or can be combined, separated, and/or performed in a different order from that described above, without departing from the example embodiments of the present disclosure. Furthermore, the use of the term "optional" in the above disclosure does not mean that any other steps not labeled as "optional" are not optional. As such, any claims not reciting a step that is not labeled as optional is not to be deemed as missing an essential step, but instead should be deemed as reciting an embodiment where such omitted steps are deemed to be optional in that embodiment.

Figure 4:
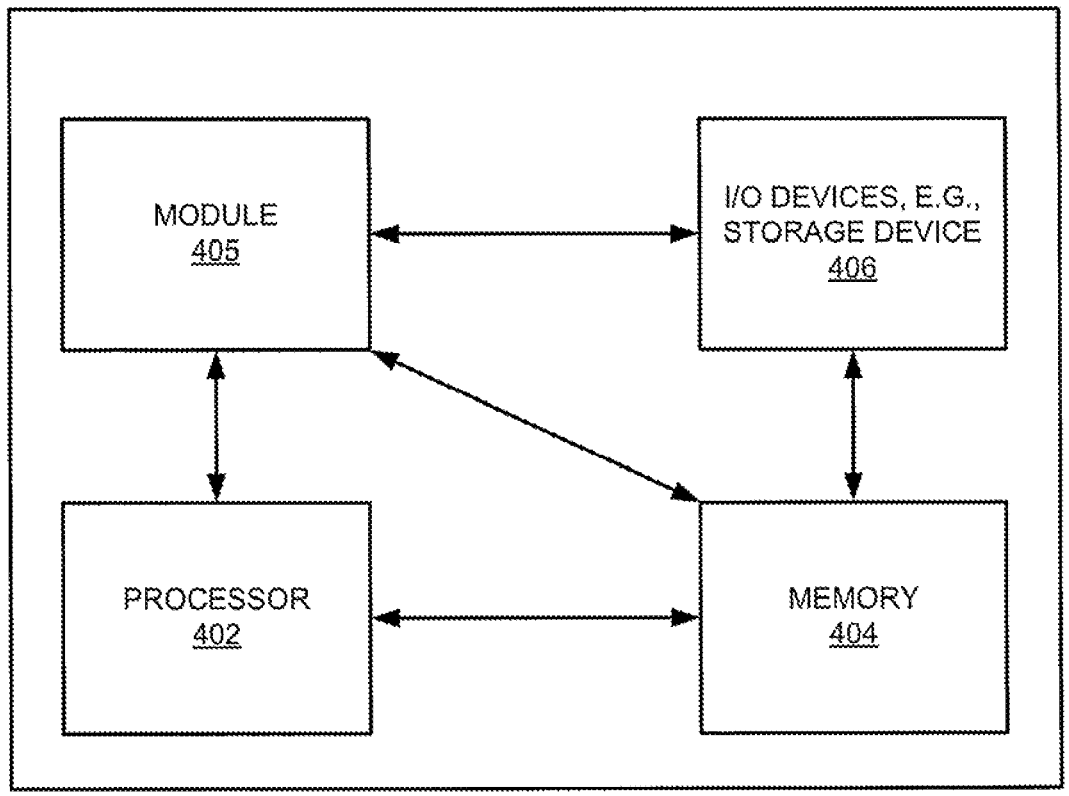
FIG. 4 illustrates a high-level block diagram of a computer suitable for use in performing the functions described herein.

FIG. 4 depicts a high-level block diagram of a computing device suitable for use in performing the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for controlling access to a custom browser functionality, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300, as discussed above, is implemented in a distributed or parallel manner for a particular illustrative example, i.e., the steps of the above method 300, or the entirety of method 300 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one embodiment, instructions and data for the present module or process 405 for controlling access to a custom browser functionality (e.g., a software program comprising computer-executable instructions) can be loaded into memory 404 and executed by hardware processor element 402 to implement the steps, functions or operations as discussed above in connection with the illustrative method 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for controlling access to a custom browser functionality (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method for controlling an access to a custom browser function, the method comprising:
sending, by a processor, a request to a third party website;
receiving, by the processor, in response to the sending, a browser script;
detecting, by the processor, that the browser script is trying to access the custom browser function, wherein the custom browser function comprises a script, wherein the script comprises a javascript object that is not created by a manufacturer of a browser embedded in a system of the processor, and wherein the script includes a function call to check an access control list;
comparing, before allowing the browser script to access the custom browser function, by the processor, in response to the detecting, one or more parameters associated with the custom browser function to a corresponding one or more parameters in the access control list to control the access of the custom browser function, wherein the one or more parameters comprise at least one of: a domain, a path and an object; and terminating, by the processor, in response to the comparing, the custom browser function when a match of the one or more parameters is found in the corresponding one or more parameters in the access control list.

2. The method of claim 1, wherein the browser script comprises a javascript object.

3. The method of claim 1, wherein the script is outside of a European Computer Manufacturers Association standard.

4. The method of claim 1, wherein the access control list is defined by a service provider and received by the system of the processor.

5. The method of claim 1, further comprising:
displaying, by the processor, an error message when the custom browser function is terminated.

6. The method of claim 1, further comprising:
rendering, by the processor, the third party website in an incomplete form when the custom browser function is terminated.

7. The method of claim 1, wherein the processor is part of a set top box.

8. The method of claim 1, wherein the processor is part of a video game console.

9. The method of claim 1, wherein the processor is part of a television.

10. A non-transitory computer-readable storage device storing a plurality of instructions which, when executed by a processor, cause the processor to perform operations for controlling an access to a custom browser function, the operations comprising:

sending a request to a third party website;
receiving, in response to the sending, a browser script;
detecting that the browser script is trying to access the custom browser function, wherein the custom browser function comprises a script, wherein the script comprises a javascript object that is not created by a manufacturer of a browser embedded in a system of the processor, and wherein the script includes a function call to check an access control list;
comparing, before allowing the browser script to access the custom browser function, in response to the detecting, one or more parameters associated with the custom browser function to a corresponding one or more parameters in the access control list to control the access of the custom browser function, wherein the one or more parameters comprise at least one of: a domain, a path and an object; and
terminating, in response to the comparing, the custom browser function when a match of the one or more parameters is found in the corresponding one or more parameters in the access control list.

11. The non-transitory computer-readable storage device of claim 10, wherein the browser script comprises a javascript object.

12. The non-transitory computer-readable storage device of claim 10, wherein the script is outside of a European Computer Manufacturers Association standard.

13. The non-transitory computer-readable storage device of claim 10, wherein the access control list is defined by a service provider and received by the system of the processor.

14. The non-transitory computer-readable storage device of claim 10, wherein the operations further comprise:
displaying an error message when the custom browser function is terminated.

15. The non-transitory computer-readable storage device of claim 10, wherein the operations further comprise:
rendering the third party website in an incomplete form when the custom browser function is terminated.

16. An apparatus for controlling an access to a custom browser function, the apparatus comprising:
a hardware processor; and
a computer-readable medium storing instructions which, when executed by the processor, cause the processor to perform operations, the operations comprising:
sending a request to a third party website;
receiving, in response to the sending, a browser script;
detecting that the browser script is trying to access the custom browser function, wherein the custom browser function comprises a script, wherein the script comprises a javascript object that is not created by a manufacturer of a browser embedded in a system of the processor, and wherein the script includes a function call to check an access control list;
comparing, before allowing the browser script to access the custom browser function, in response to the detecting, one or more parameters associated with the custom browser function to a corresponding one or more parameters in the access control list to control the access of the custom browser function, wherein the one or more parameters comprise at least one of: a domain, a path and an object; and
terminating, in response to the comparing, the custom browser function when a match of the one or more parameters is found in the corresponding one or more parameters in the access control list.

17. The apparatus of claim 16, wherein the browser script comprises a javascript object.

18. The apparatus of claim 16, wherein the script is outside of a European Computer Manufacturers Association standard.

19. The apparatus of claim 16, wherein the operations further comprise:
displaying an error message when the custom browser function is terminated.

20. The apparatus of claim 16, wherein the operations further comprise:
rendering the third party website in an incomplete form when the custom browser function is terminated.

* * * * *